United States Patent
Kosaka et al.

(10) Patent No.: US 11,624,404 B2
(45) Date of Patent: Apr. 11, 2023

(54) ROLLING BEARING, ROTARY APPARATUS, AND METHOD OF MANUFACTURING ROLLING BEARING

(71) Applicant: Seiko Instruments Inc., Chiba (JP)

(72) Inventors: Takayuki Kosaka, Chiba (JP); Takayuki Satodate, Chiba (JP); Keisuke Abo, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 229 days.

(21) Appl. No.: 17/193,781

(22) Filed: Mar. 5, 2021

(65) Prior Publication Data
US 2021/0277949 A1    Sep. 9, 2021

(30) Foreign Application Priority Data

Mar. 9, 2020 (JP) .............................. JP2020-040331
Dec. 28, 2020 (JP) .............................. JP2020-219022

(51) Int. Cl.
*F16C 19/06* (2006.01)
*F16C 33/66* (2006.01)
*F16C 33/78* (2006.01)

(52) U.S. Cl.
CPC ...... *F16C 33/6618* (2013.01); *F16C 33/6622* (2013.01); *F16C 19/06* (2013.01); *F16C 33/7806* (2013.01)

(58) Field of Classification Search
CPC .. F16C 33/6618; F16C 33/6622; F16C 19/06; F16C 33/7806; F16C 33/66

USPC ......................................................... 184/5.1
See application file for complete search history.

(56) References Cited

FOREIGN PATENT DOCUMENTS

| CN | 203500282 U | * | 3/2014 | |
|---|---|---|---|---|
| JP | 2003336650 A | * | 11/2003 | .......... F16C 33/6607 |
| JP | 2013-174334 A | | 9/2013 | |
| JP | 2013-204679 A | | 10/2013 | |
| JP | 2015086940 A | * | 5/2015 | |
| JP | 2017150615 A | * | 8/2017 | |
| JP | 6263808 B2 | * | 1/2018 | |

* cited by examiner

*Primary Examiner* — Gene O Crawford
*Assistant Examiner* — Emily R Kincaid
(74) *Attorney, Agent, or Firm* — Crowell & Moring LLP

(57) ABSTRACT

A rolling bearing capable of achieving reduction in torque is provided. The rolling bearing includes an inner ring and an outer ring disposed coaxially with each other, a rolling element disposed between the inner ring and the outer ring, a seal member configured to cover an area between the inner ring and the outer ring from an outside in an axial direction, and filled grease disposed between the rolling element and the seal member. The filled grease includes a first ring-like part which extends to form a circumferential shape centering on a common axis of the inner ring and the outer ring, and which has contact with one of the inner ring and the outer ring, and a second ring-like part which extends to form a circumferential shape centering on the common axis, which is connected to the first ring-like part at an outer side in the axial direction, and which has contact with the seal member.

9 Claims, 11 Drawing Sheets

ROLLING BEARING, ROTARY APPARATUS, AND METHOD OF MANUFACTURING ROLLING BEARING

RELATED APPLICATIONS

This application claims priority to Japanese Patent Application Nos. 2020-040331, filed on Mar. 9, 2020, and 2020-219022, filed on Dec. 28, 2020, the entire contents of which are incorporated herein by reference.

BACKGROUND OF THE INVENTION

1. Field of the Invention

The present disclosure relates to a rolling bearing, a rotary apparatus, and a method of manufacturing a rolling bearing.

2. Description of the Related Art

In the past, some rolling bearings have held grease between a pair of bearing rings (an inner ring and an outer ring). In the rolling bearing of this kind, resistance of the grease becomes a factor for increasing the torque in some cases. Incidentally, in rolling bearings, there is desired a decrease in torque for the purpose of power saving of a rotary apparatus to which the rolling bearings are installed. In particular, in small-sized rolling bearings to be used in a variety of types of motors such as a fan motor, there is a high demand for the decrease in torque.

Therefore, in order to decrease the torque of the rolling bearing, the grease is applied to end parts in the axial direction in a stationary ring (the outer ring in most cases) of the rolling bearing and a seal member disposed at the end part side to thereby achieve a decrease in an amount of grease having contact with rolling elements (balls) and a holder for holding the rolling elements (see, e.g., JP-A-2013-204679 (Document 1)). In the rolling bearing described in Document 1, the grease is applied so as to be shifted toward the inner circumferential surface of the outer ring so as to form a ring-like shape so that the grease is attached to the inner circumferential surface of the outer ring except the track surface making contact with the rolling elements, but does not make contact with an outer circumferential surface of the inner ring.

Incidentally, as a method of applying the grease to the bearing rings so as to form a ring-like shape, there is a method of relatively rotating a nozzle and the bearing rings while ejecting the grease from the nozzle. However, when applying the grease throughout the whole circumference to form a ring-like shape, the grease gradually collapses due to the own weight immediately after the application in some cases. In this case, there is a possibility that the grease unnecessarily makes contact with the rolling elements and the holder to make the torque of the rolling bearing higher than the desired torque.

Therefore, the present disclosure provides a rolling bearing, a rotary apparatus, and a method of manufacturing a rolling bearing each capable of achieving the reduction in torque.

SUMMARY OF THE INVENTION

A rolling bearing according to the present disclosure includes an inner ring and an outer ring disposed coaxially with each other, a rolling element disposed between the inner ring and the outer ring, a seal member configured to cover an area between the inner ring and the outer ring from an outside in an axial direction, and grease disposed between the rolling element and the seal member, wherein the grease includes a first ring-like part which extends to form a circumferential shape centering on a common axis of the inner ring and the outer ring, and which has contact with one of the inner ring and the outer ring, and a second ring-like part which extends to form a circumferential shape centering on the common axis, which is connected to the first ring-like part at an outer side in the axial direction, and which has contact with the seal member.

According to the present disclosure, when applying the desired amount of grease, the first ring-like part and the second ring-like part are formed, and accordingly, it is possible to reduce the volume of the first ring-like part compared to when applying the grease so as to form a single ring-like part. Therefore, when applying the grease, by forming the first ring-like part prior to the second ring-like part, it is possible to make the collapse of the first ring-like part by the own weight difficult to occur. Further, by disposing the second ring-like part, the second ring-like part is supported by the seal member, and at the same time, the first ring-like part is supported not only by one of the inner ring and the outer ring but also by the seal member via the second ring-like part. Therefore, the grease becomes difficult to collapse as a whole by the own weight from the shape immediately after the application. Therefore, it is possible to prevent the grease from unnecessarily making contact with the rolling element and the holder. Therefore, the reduction in torque of the rolling bearing can be achieved.

In the rolling bearing described above, the one of the inner ring and the outer ring can be disposed as a stationary ring.

According to the present disclosure, since the grease makes contact with the stationary ring, it is possible to prevent the centrifugal force from acting on the grease when the rolling bearing rotates, and thus, it is possible to prevent the grease from collapsing from the shape immediately after the application. Therefore, the reduction in torque of the rolling bearing can be achieved.

In the rolling bearing described above, the one of the inner ring and the outer ring can be the outer ring.

According to the present disclosure, since the displacement of the grease toward the outer side in the radial direction is restricted by the outer ring even when grease rotates and the centrifugal force acts on the grease when the rolling bearing rotates, it is possible to keep the grease in the shape immediately after the application. Therefore, the reduction in torque of the rolling bearing can be achieved.

In the rolling bearing described above, the seal member can be attached to the one of the inner ring and the outer ring.

According to the present disclosure, since the one of the inner ring and the outer ring, and the seal member are disposed so as not to make the relative rotation, it is possible to prevent the grease making contact with the both from being agitated. Therefore, it is possible to keep the grease in the shape immediately after the application. Therefore, the reduction in torque of the rolling bearing can be achieved.

In the rolling bearing described above, the second ring-like part can be disposed at an opposite side to the one of the inner ring and the outer ring in a radial direction centering on the common axis with respect to the first ring-like part.

According to the present disclosure, compared to the configuration in which the first ring-like part and the second ring-like part are arranged in the axial direction, there is disposed a space for disposing the first ring-like part at the inner ring side or the outer ring side in the radial direction with respect to the second ring-like part, and it is possible to dispose the first ring-like part at further outer side in the axial direction. Thus, it is possible to prevent the grease from unnecessarily making contact with the rolling element and the holder. Therefore, the reduction in torque of the rolling bearing can be achieved.

In the rolling bearing described above, the first ring-like part can have a first overlapping part which extends from one circumferential end part as much as an angle no smaller than 360° and smaller than 720° centering on the common axis to reach another circumferential end part to thereby reduplicate when viewed from the axial direction, the second ring-like part can have a second overlapping part which extends from one circumferential end part as much as an angle no smaller than 360° and smaller than 720° centering on the common axis to reach another circumferential end part to thereby reduplicate when viewed from the axial direction, and the second overlapping part can be disposed at a position shifted in a circumferential direction around the common axis with respect to the first overlapping part.

Here, the cross-sectional area of the cross-sectional surface of the first ring-like part becomes larger in the first overlapping part than in other portions, and the cross-sectional area of the cross-sectional surface of the second ring-like part becomes larger in the second overlapping part than in other portions. When assuming that the first overlapping part and the second overlapping part are disposed at the same position in the circumferential direction, the grease becomes apt to spread at the position where the first overlapping part and the second overlapping part overlap each other. According to the present disclosure, since the first overlapping part and the second overlapping part are disposed at the respective positions shifted in the circumferential direction from each other, it is possible to prevent the grease from spreading in the axial direction to unnecessarily make contact with the rolling elements and the holder. Therefore, the reduction in torque of the rolling bearing can be achieved.

In the rolling bearing described above, there can further be included other grease disposed at an opposite side to the grease in the axial direction with respect to the rolling element.

According to the present disclosure, it is possible to increase the total amount of the grease disposed in the bearing with the other grease while preventing the other grease from interfering with the first ring-like part and the second ring-like part to make the grease lose shape. Therefore, it is possible to provide the bearing the extension of life of which is achieved.

A rotary apparatus according to the present disclosure includes a rotary element disposed rotatably, a support element configured to rotatably support the rotary element, and the rolling bearing described above which intervenes between the rotary element and the support element.

According to the present disclosure, since the rolling bearing reduced in torque is provided, it is possible to reduce the rotational resistance of the rotary element with respect to the support element, and thus, it is possible to achieve the power saving of the rotary apparatus.

A method of manufacturing a rolling bearing according to the present disclosure is a method of manufacturing a rolling bearing described above, and includes a first application step of ejecting the grease from a first nozzle at a first application position to form the first ring-like part, and a second application step of ejecting the grease from a second nozzle different from the first nozzle at a second application position different from the first application position to form the second ring-like part.

According to the present disclosure, it is possible to shorten the cycle time at each application position. Therefore, it is possible to increase the manufacturing efficiency of the bearing. Further, in the manufacturing method of applying the grease to form the ring-like shape while rotating the bearing, since a mechanism for driving the nozzle in the radial direction with respect to the bearing becomes unnecessary, it is possible to simplify a structure of the device for applying the grease.

According to the present disclosure, it is possible to provide a rolling bearing, a rotary apparatus, and a method of manufacturing a rolling bearing each capable of achieving the reduction in torque.

DETAILED DESCRIPTION OF THE PREFERRED EMBODIMENTS embodiments of the present disclosure will hereinafter be described based on the drawings. It should be noted that in the following description, constituents having the same functions or similar functions are denoted by the same reference symbols. Further, the redundant descriptions of those constituents are omitted in some cases.

First Embodiment

A first embodiment of the present disclosure will be described with reference to FIG. 1 through FIG. 8.

Figure 1:
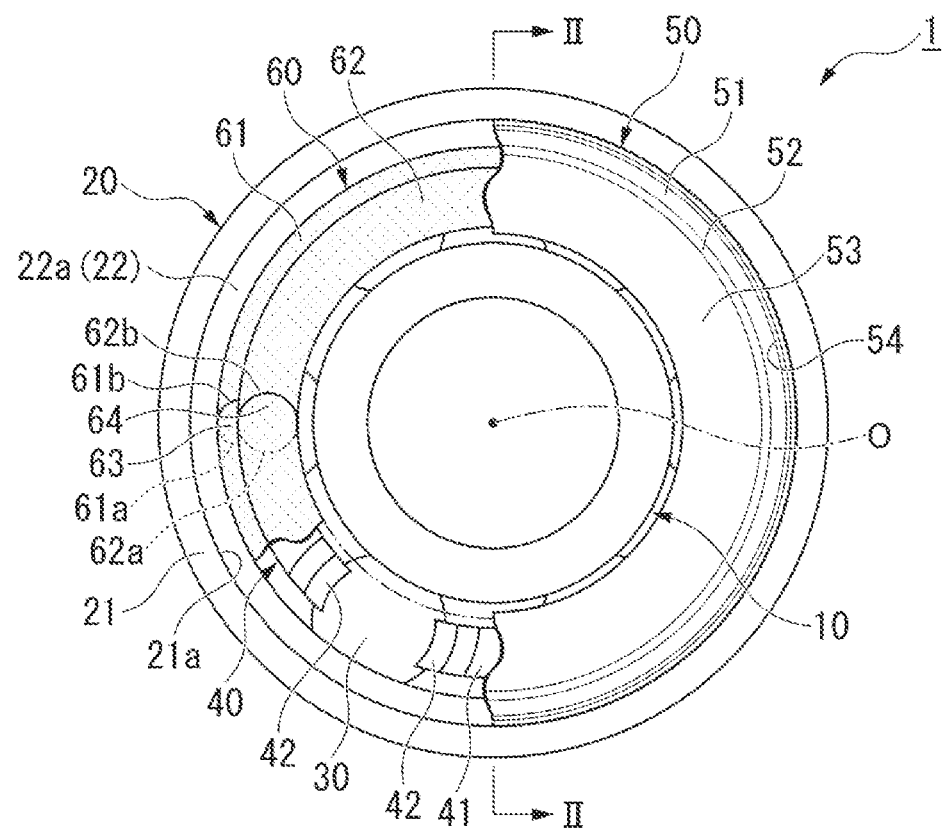
FIG. 1 is a plan view of a rolling bearing according to a first embodiment.
Figure 2:
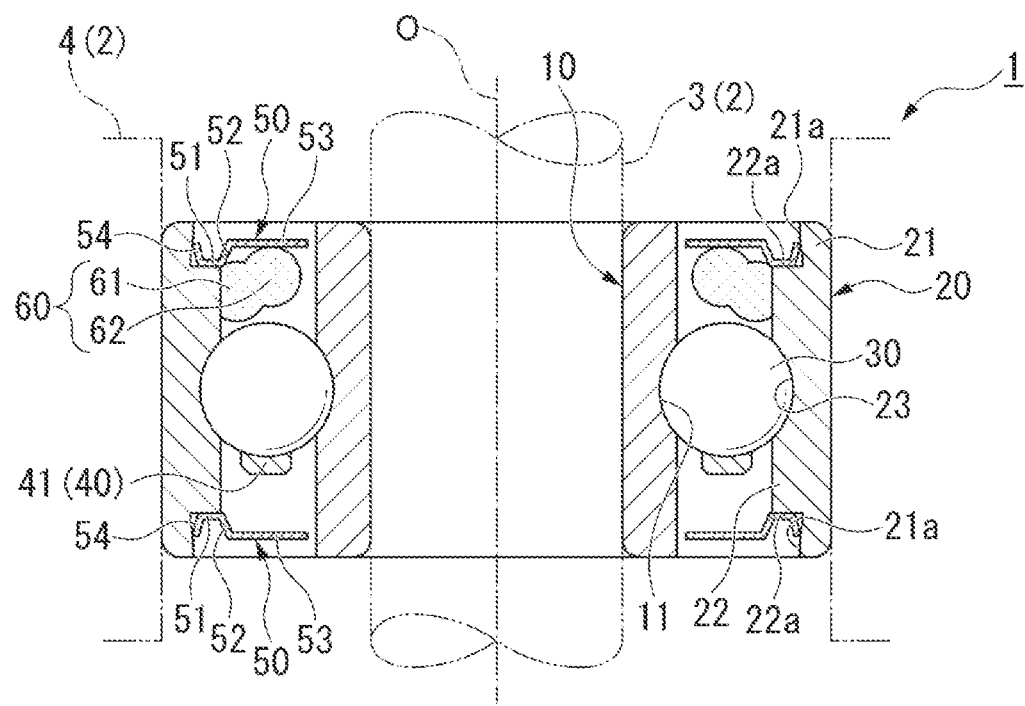
FIG. 2 is a cross-sectional view along the line II-II in FIG. 1.

FIG. 1 is a plan view of a rolling bearing according to the first embodiment. FIG. 2 is a cross-sectional view along the line II-II in FIG. 1. It should be noted that in FIG. 1, an illustration of a part of each of seal members 50 and filled grease 60 described later is omitted in order to make the internal configuration of the rolling bearing 1 eye-friendly. Further, in FIG. 2, a member to which the rolling bearing 1 is installed is represented by imaginary lines.

As shown in FIG. 1 and FIG. 2, the rolling bearing 1 is a ball bearing provided with an inner ring 10 and an outer ring 20 as bearing rings, a plurality of rolling elements 30, a holder 40, a pair of seal members 50, and the filled grease 60. The rolling bearing 1 is provided to a rotary apparatus 2 such as a fan motor. The rotary apparatus 2 is provided with a shaft 3 (a rotary element) formed rotatably centering on a common axis O, and a chassis 4 (a support element) which is stationary set to rotatably support the shaft 3. The rolling bearing 1 intervenes between the shaft 3 and the chassis 4. It should be noted that the rolling bearing will hereinafter be referred to simply as a bearing in some cases. Further, in the present embodiment, the grease in the state in which the bearing 1 has not yet been filled with the grease is referred to simply as grease, and the grease in the state in which the grease is applied to the bearing 1, and thus the bearing 1 is filled with the grease is referred to as the filled grease 60.

The inner ring 10 and the outer ring 20 are disposed coaxially with each other so that the respective central axes are disposed on the common axis O. In the present embodiment, a direction in which the common axis O extends is referred to as an axial direction, directions perpendicular to the common axis O and radially extending from the common axis O are each referred to a radial direction, and a direction circling around the common axis O is referred to as a circumferential direction.

The inner ring 10 is disposed as a rotary ring. The inner ring 10 is fitted around the shaft 3, and is fixed to the shaft 3. The outer ring 20 is disposed as a stationary ring. The outer ring 20 is fitted into a recessed part (or a through hole) of the chassis 4, and is fixed to the chassis 4. The outer ring 20 surrounds the inner ring 10 from the outside in the radial direction in a state of forming an annular space between the outer ring 20 and the inner ring 10. The plurality of rolling elements 30 is disposed between the inner ring 10 and the outer ring 20, and is rotatably held by the holder 40. The holder 40 rotatably holds each of the rolling elements 30 in a state in which the rolling elements are arranged in the circumferential direction at regular intervals. The seal members 50 each cover the annular space between the inner ring 10 and the outer ring 20 from the outside in the axial direction.

The outer ring 20 is formed of a metal material such as stainless steel or bearing steel so as to form a ring-like shape. It should be noted that the outer ring 20 is not limited to a metallic ring, and can be formed of a different material. The outer ring 20 has an outer ring main body 21 having the width along the axial direction made equivalent to the width along the axial direction of the inner ring 10, and a protruding part 22 protruding from the outer ring main body 21 toward the inside in the radial direction. The protruding part 22 is formed in a portion located at the center in the axial direction in the outer ring main body 21. The width along the axial direction of the protruding part 22 is shorter than the width along the axial direction of the outer ring main body 21, and larger than an outside diameter of the rolling elements 30.

On the inner circumferential surface of the protruding part 22, there is formed an outer ring rolling surface 23 recessed toward the outside in the radial direction. The outer ring rolling surface 23 is formed to have a semispherical cross-sectional shape so as to fit in the outer surface of the rolling element 30, and at the same time, formed to have a ring-like shape extending in the circumferential direction throughout the entire circumference of the inner circumferential surface of the protruding part 22. The outer ring rolling surface 23 is formed in a portion located at the center in the axial direction in the inner circumferential surface of the protruding part 22. A portion other than the outer ring rolling surface 23 out of the inner circumferential surface of the protruding part 22 extends in the axial direction with a constant inside diameter. The protruding part 22 is provided with a pair of end surfaces 22a facing to the axial direction. Each of the end surfaces 22a extends in parallel to both of the radial direction and the circumferential direction.

The outer ring main body 21 has a pair of inner circumferential surfaces 21a each extending form an outer circumferential edge of corresponding one of the end surfaces 22a of the protruding part 22 to an opening edge of the outer ring 20. A portion located at the inner side in the axial direction in each of the inner circumferential surfaces 21a is located at the outer side in the radial direction from a part located at the outer side in the axial direction.

The inner ring 10 is formed of a metal material such as stainless steel or bearing steel so as to form a ring-like shape. It should be noted that the inner ring 10 is not limited to a metallic ring, and can be formed of a different material. On the outer circumferential surface of the inner ring 10, there is formed an inner ring rolling surface 11 recessed toward the inside in the radial direction. The inner ring rolling surface 11 is formed to have a semispherical cross-sectional shape so as to fit in the outer surface of the rolling element 30, and at the same time, formed to have a ring-like shape extending in the circumferential direction throughout the entire circumference of the outer circumferential surface. The inner ring rolling surface 11 is formed in a portion located at the center in the axial direction in the outer circumferential surface of the inner ring 10, and is disposed so as to be opposed to the outer ring rolling surface 23 in the radial direction. A portion other than the inner ring rolling surface 11 out of the outer circumferential surface of the inner ring 10 extends in the axial direction with a constant outside diameter.

The rolling elements 30 are each formed of a metal material such as stainless steel or bearing steel so as to form a spherical shape. The rolling elements 30 are disposed between the outer ring rolling surface 23 and the inner ring rolling surface 11, and are rotatably supported by the outer ring rolling surface 23 and the inner ring rolling surface 11.

The holder 40 is formed of a resin material or a metal material to have a ring-like shape as a whole. The holder 40 is disposed centering on the common axis O. The holder 40 is provided with a main body part 41 and a plurality of pairs of stop parts 42, wherein the stop parts 42 rise from the main body part 41 toward one side in the axial direction, and the main body part 41 is formed to have a ring-like shape, and is disposed at the other side in the axial direction with respect to the plurality of rolling elements 30. The pair of stop parts 42 rotatably hold one rolling element 30. The pair of stop parts 42 rise to form a circular arc shape so that the distance therebetween decreases from the main body part 41 toward the tips thereof. The holder 40 is disposed at a distance from each of the inner ring 10 and the outer ring 20 so as not to interfere with the inner ring 10 and the outer ring 20. In the present embodiment, the whole of the holder 40 is located at the inner side in the axial direction from the pair of end surfaces 22a of the protruding part 22 of the outer ring 20.

The seal members 50 are each formed to have a ring-like plate shape. The seal members 50 are disposed centering on the common axis O. The seal members 50 are attached to the outer ring 20. The seal members 50 are respectively disposed one by one at the both sides in the axial direction with respect to the plurality of rolling elements 30. The seal members 50 are each provided with a base part 51 which is disposed so as to overlap the end surface 22a of the protruding part 22 of the outer ring 20 from outer side in the axial direction, a step part 52 extending from an inner circumferential edge of the base part 51 outward in the axial direction, a cover part 53 projecting inward in the radial direction from the end edge at the outer side in the axial direction in the step part 52, and a locking part 54 extending from the outer circumferential edge of the base part 51 toward the outer side in the radial direction and the outer side in the axial direction. The seal members 50 each extend in the radial direction so as to straddle at least the center of the rolling element 30 in the plan view. In the present embodiment, the cover part 53 overlaps the center of the rolling element 30 in the plan view. It should be noted that it is possible for the step part 52 to extend from the inner circumferential edge of the base part 51 toward the outer side in the axial direction and the inner side in the radial direction to overlap the center of the rolling element 30 in the plan view. The inner circumferential edge of the cover part 53 is disposed at a distance from the outer circumferential surface of the inner ring 10. The outer circumferential edge of the locking part 54 is locked with the inner circumferential surface 21a of the outer ring main body 21 from the inner side in the axial direction. Thus, the seal members 50 are fixed to the outer ring 20.

The filled grease 60 is disposed between the rolling elements 30 and the seal member 50. The filled grease 60 is disposed only at one side in the axial direction with respect to the rolling element 30 in the annular space between the inner ring 10 and the outer ring 20. In the present embodiment, the filled grease 60 is disposed at one side in the axial direction with respect to the rolling element 30. In other words, the filled grease 60 is disposed at the opposite side to the main body 41 of the holder 40 across the rolling elements 30 in the axial direction. The filled grease 60 is disposed so as to form a ring-like shape in the plan view, and is disposed coaxially around the common axis O. The filled grease 60 has contact with the outer ring 20 disposed as the stationary ring, and is separated from the inner ring 10 disposed as the rotary ring. Further, the filled grease 60 is separated from the rolling elements 30 and the holder 40. It should be noted that it is possible for the filled grease 60 to have contact with at least either one of the rolling elements 30 and the holder 40.

The filled grease 60 is provided with a first ring-like part 61 having contact with the outer ring 20, and a second ring-like part 62 which is connected to the first ring-like part 61, and which has contact with the seal member 50. The first ring-like part 61 and the second ring-like part 62 are formed by applying the grease in twice. The first ring-like part 61 extends to form a circumferential shape centering on the common axis O. The first ring-like part 61 has contact with a place at the outer side in the axial direction from the outer ring rolling surface 23 in the inner circumferential surface of the protruding part 22 of the outer ring 20. The second ring-like part 62 extends to form a circumferential shape centering on the common axis O. The second ring-like part 62 is separated from the outer ring 20 with which the first ring-like part 61 has contact out of the bearing rings. The second ring-like part 62 is disposed at the opposite side to the outer ring 20 in the radial direction (i.e., the inner side in the radial direction) with respect to the first ring-like part 61. Specifically, the outer circumferential edge of the second ring-like part 62 is located at the inner side in the redial direction from the outer circumferential edge of the first ring-like part 61, and the inner circumferential edge of the second ring-like part 62 is located at the inner side in the radial direction from the inner circumferential edge of the first ring-like part 61. The second ring-like part 62 is connected to the first ring-like part 61 at the outer side in the axial direction to thereby be integrated with each other. The second ring-like part 62 is connected to the first ring-like part 61 throughout the entire circumferential surface. The second ring-like part 62 has contact with the surface of the seal member 50 facing to the inside in the axial direction to thereby be supported by the seal member 50. In the present embodiment, the second ring-like part 62 has contact with the inner surface of the cover part 53 of the seal member 50.

The first ring-like part 61 and the second ring-like part 62 are each formed by applying the grease ejected from the nozzle as much as an angle no smaller than 360° to form the circumferential shape. The first ring-like part 61 and the second ring-like part 62 each extend continuously throughout the entire circumference so as not to form a missing part in the plan view. The first ring-like part 61 extends from one circumferential end part 61a as much as an angle no smaller than 360° and smaller than 720° centering on the common axis O, and reaches the other circumferential end part 61b. Thus, the first ring-like part 61 has a first overlapping part 63 which includes the one circumferential end part 61a and the other circumferential end part 61b, and which reduplicates in the plan view. It is desirable for the length in the circumferential direction of the first overlapping part 63 to be sufficiently small. For example, the length in the circumferential direction of the first overlapping part 63 is set at substantially the same level as the width of the first ring-like part 61 in the plan view. The second ring-like part 62 extends from one circumferential end part 62a as much as an angle no smaller than 360° and smaller than 720° centering on the common axis O, and reaches the other circumferential end part 62b. Thus, the second ring-like part 62 has a second overlapping part 64 which includes the one circumferential end part 62a and the other circumferential end part 62b, and which reduplicates in the plan view. It is desirable for the length in the circumferential direction of the second overlapping part 64 to be sufficiently small. For example, the length in the circumferential direction of the second overlapping part 64 is set at substantially the same level as the width of the second ring-like part 62 in the plan view. At least a part of the second overlapping part 64 is disposed at the same position in the circumferential direction as the first overlapping part 63, and is connected to the first overlapping part 63.

Then, a method of applying the grease will be described as a method of manufacturing the bearing 1 according to the present embodiment.

Figure 3:
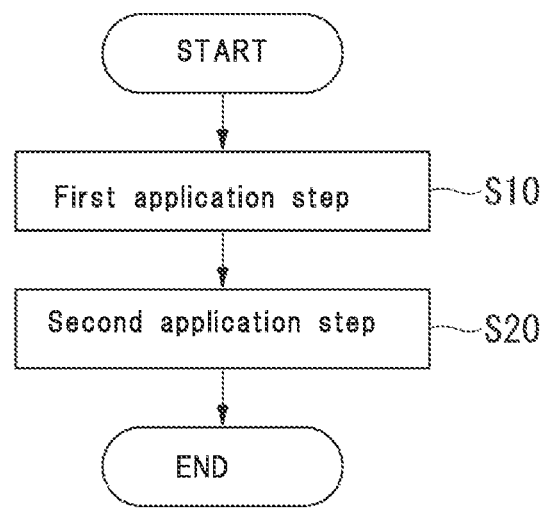
FIG. 3 is a flowchart showing a method of applying grease according to the first embodiment.

FIG. 3 is a flowchart showing a method of applying the grease according to the first embodiment.

As shown in FIG. 3, the method of applying the grease according to the present embodiment is provided with a first application step S10 and a second application step S20.

Figure 4:
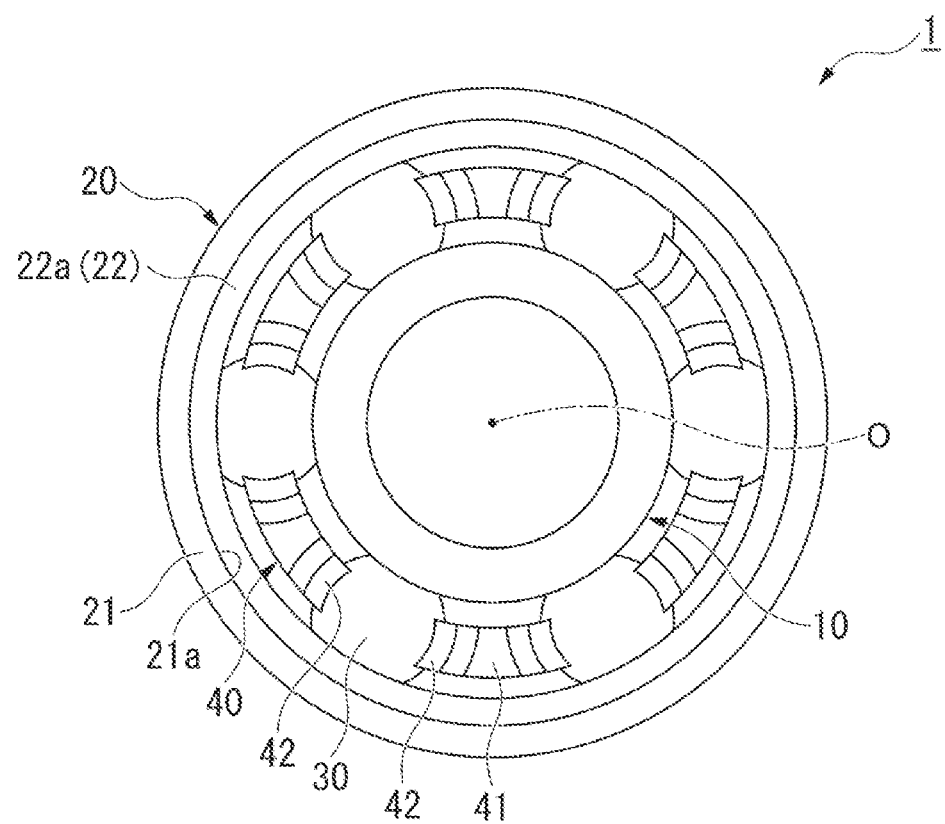
FIG. 4 is a plan view for explaining the method of applying the grease.
Figure 5:
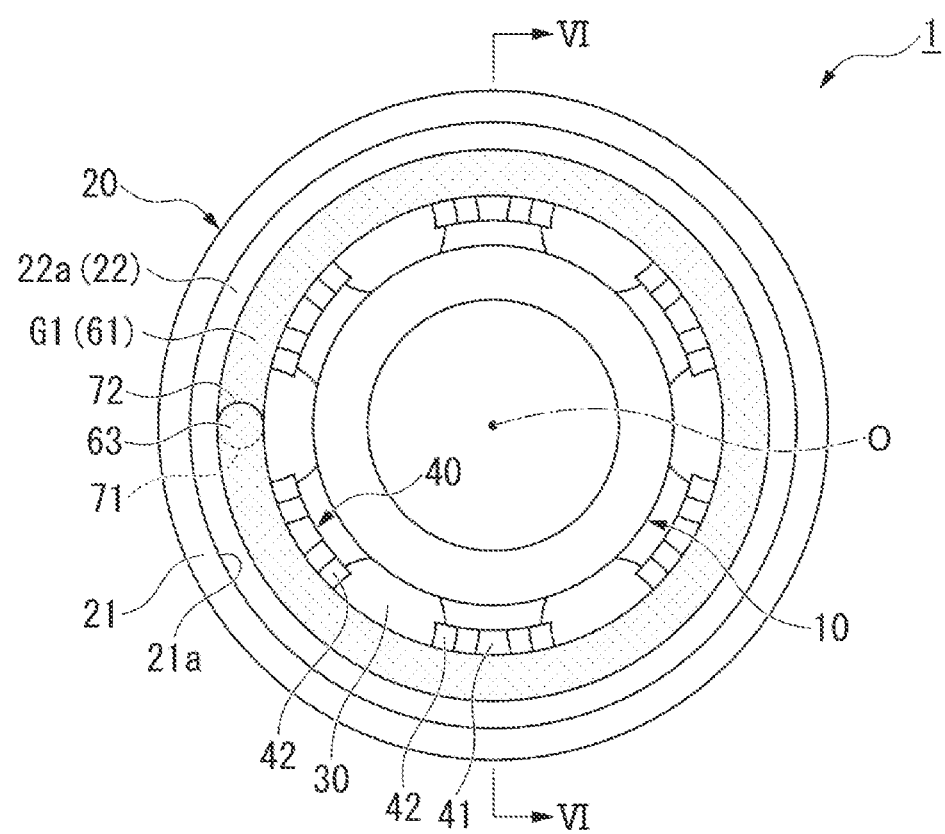
FIG. 5 is a plan view for explaining the method of applying the grease.
Figure 6:
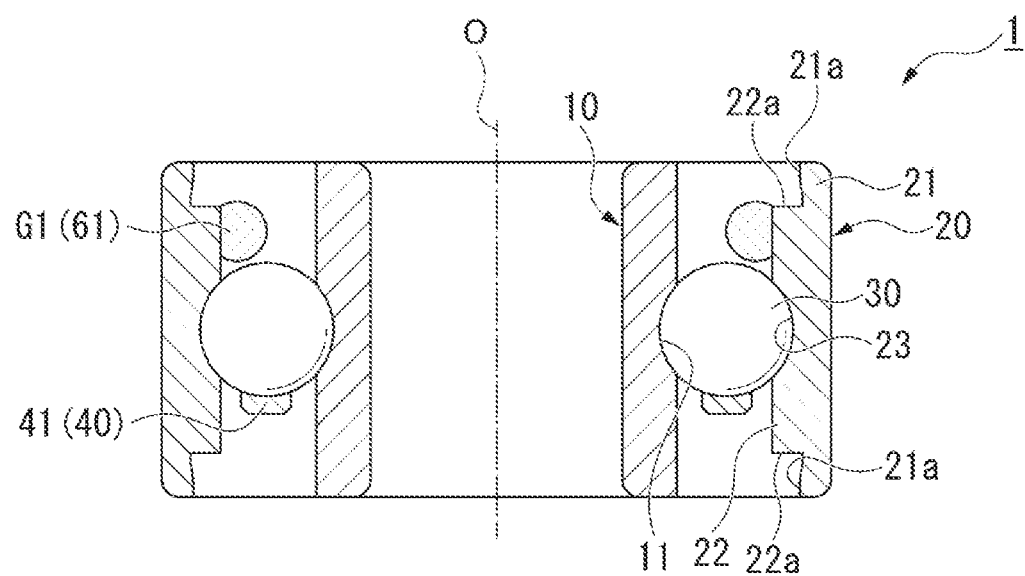
FIG. 6 is a cross-sectional view along the line VI-VI in FIG. 5.
Figure 7:
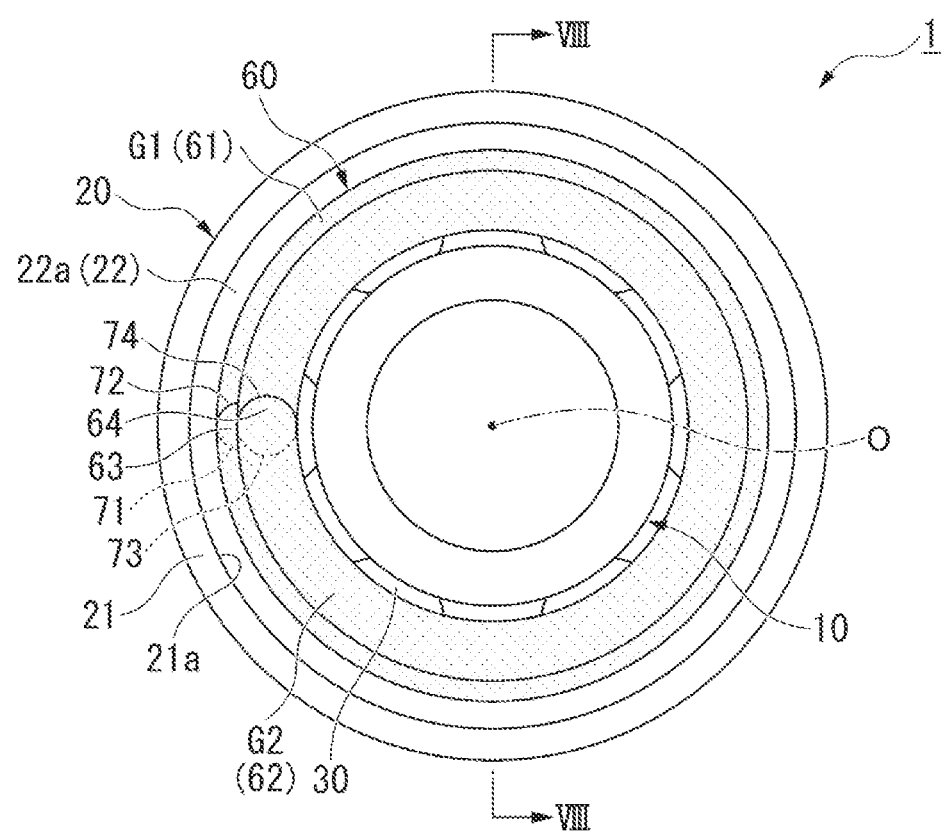
FIG. 7 is a plan view for explaining the method of applying the grease.
Figure 8:
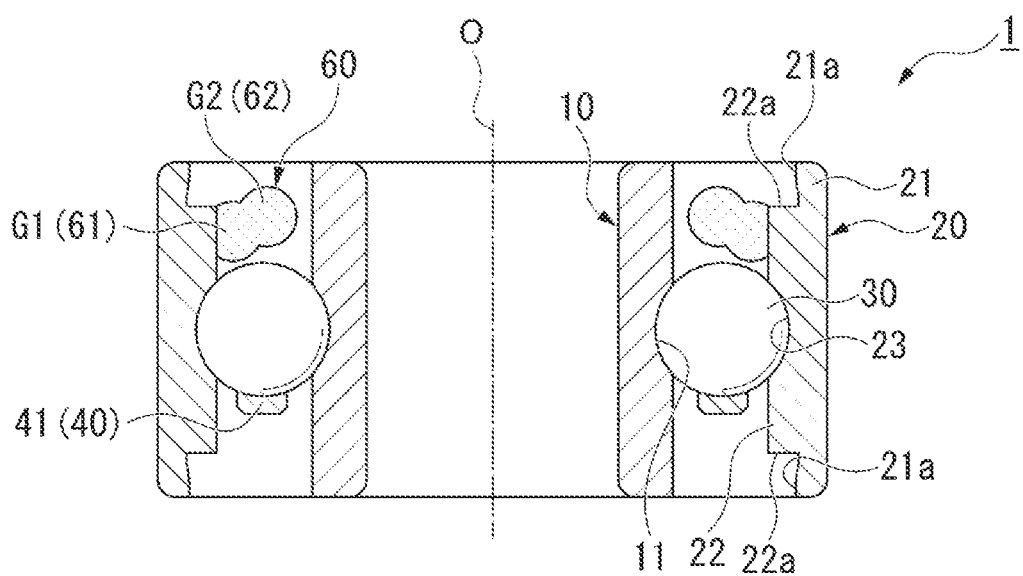
FIG. 8 is a cross-sectional view along the line VIII-VIII in FIG. 7.

FIG. 4, FIG. 5, and FIG. 7 are plan views for explaining the method of applying the grease. FIG. 6 is a cross-sectional view along the line VI-VI in FIG. 5. FIG. 8 is a cross-sectional view along the line VIII-VIII in FIG. 7.

As shown in FIG. 4, the first application step S10 is performed in a state in which the seal members 50 are not attached to the outer ring 20. Specifically, the grease is applied in the state in which the annular space between the inner ring 10 and the outer ring 20 is opened in the axial direction, and the rolling elements 30 and the holder 40 are exposed.

As shown in FIG. 5 and FIG. 6, in the first application step S10, the grease G1 is ejected from the nozzle not shown while rotating the nozzle centering on the common axis O with respect to the outer ring 20. On this occasion, the position of the nozzle is adjusted so that the grease G1 ejected makes contact with the end part in the axial direction in the inner circumferential surface of the protruding part 22 of the outer ring 20. Since the grease G1 is ejected while rotating the nozzle relatively to the outer ring 20, the grease G1 extends to form the circular arc shape. The grease G1 having been attached to the outer ring 20 extends as much as an angle no smaller than 360° from a starting end 71 corresponding to an ejection starting point, and reaches a stopping end 72 corresponding to an ejection ending point. Thus, the first ring-like part 61 having the first overlapping part 63 is formed.

As shown in FIG. 7 and FIG. 8, in the second application step S20, the nozzle is shifted from the position in the first application step S10, and then, the grease G2 is ejected from the nozzle while rotating the nozzle centering on the common axis O with respect to the outer ring 20 once again. On this occasion, the position of the nozzle is adjusted so that the grease G2 ejected makes contact with the first ring-like part 61 from the outer side in the axial direction and the inner side in the radial direction, and the grease G2 thus applied protrudes toward the outer side in the axial direction from the first ring-like part 61. The grease G2 having made contact with the first ring-like part 61 extends as much as an angle no smaller than 360° from a starting end 73 corresponding to an ejection starting point, and reaches a stopping end 74 corresponding to an ejection ending point. On this occasion, the starting end 73 of the grease G2 in the second application step S20 is located at the same position in the circumferential direction as the starting end 71 of the grease G1 in the first application step S10. Further, the stopping end 74 of the grease G2 in the second application step S20 is located at the same position in the circumferential direction as the stopping end 72 of the grease G1 in the first application step S10. Thus, the second ring-like part 62 having the second overlapping part 64 is formed.

Due to the above, application of the grease is completed. Subsequently, the seal members 50 are inserted in the annular space between the inner ring 10 and the outer ring 20 from the outer side in the axial direction to attach the seal members 50 to the outer ring 20. On this occasion, the grease applied in the second application step S20 makes contact with the cover part 53 of the seal member 50 to achieve the state shown in FIG. 2.

As described above, the first ring-like part 61 and the second ring-like part 62 are formed of the grease ejected in the respective steps different from each other. Thus, a portion of a contour of the cross-sectional surface of the first ring-like part 61 which does not have contact with the outer ring 20 or the second ring-like part 62 extends to form a circular arc shape or an elliptical arc shape centering on the position overlapping the first ring-like part 61. Further, a portion of a contour of the cross-sectional surface of the second ring-like part 62 which does not have contact with the seal member 50 or the first ring-like part 61 extends to form a circular arc shape or an elliptical arc shape centering on the position overlapping the second ring-like part 62.

As described hereinabove, the bearing 1 according to the present embodiment is provided with the filled grease 60 having the first ring-like part 61 which extends to form the circumferential shape centering on the common axis O, and which has contact with the outer ring 20, and the second ring-like part 62 which extends to form the circumferential shape centering on the common axis O, which is connected to the first ring-like part 61 at the outer side in the axial direction, and which has contact with the seal member 50. According to this configuration, when applying the desired amount of grease, the first ring-like part 61 and the second ring-like part 62 are formed, and accordingly, it is possible to reduce the volume of the first ring-like part 61 compared to when applying the grease so as to form a single ring-like part. Therefore, when applying the grease, by forming the first ring-like part 61 prior to the second ring-like part 62, it is possible to make the collapse of the first ring-like part 61 by the own weight difficult to occur. Further, by disposing the second ring-like part 62, the second ring-like part 62 is supported by the seal member 50, and at the same time, the first ring-like part 61 is supported not only by the outer ring 20 but also by the seal member 50 via the second ring-like part 62. Therefore, the filled grease 60 becomes difficult to collapse as a whole by the own weight from the shape immediately after the application. Therefore, it is possible to prevent the filled grease 60 from unnecessarily making contact with the rolling elements 30 and the holder 40. Therefore, the reduction in torque of the bearing 1 can be achieved.

Further, the outer ring 20 as the bearing rings with which the filled grease 60 makes contact is disposed as the stationary ring. According to this configuration, since the filled grease 60 makes contact with the stationary ring, it is possible to prevent the centrifugal force from acting on the filled grease 60 when the bearing 1 rotates, and thus, it is possible to prevent the filled grease 60 from collapsing from the shape immediately after the application. Therefore, the reduction in torque of the bearing 1 can be achieved.

The seal members 50 are attached to the outer ring 20 as the bearing rings with which the filled grease 60 makes contact. According to this configuration, since the outer ring 20 and the seal members 50 are disposed so as not to make the relative rotation, it is possible to prevent the filled grease 60 making contact with both of the outer ring 20 and the seal members 50 from being agitated. Therefore, it is possible to keep the filled grease 60 in the shape immediately after the application. Therefore, the reduction in torque of the bearing 1 can be achieved.

The second ring-like part 62 is disposed at the opposite side to the outer ring 20 in the radial direction with respect to the first ring-like part 61. According to this configuration, compared to the configuration in which the first ring-like part and the second ring-like part are arranged in the axial direction, there is disposed a space for disposing the first ring-like part 61 at the outer side in the radial direction of the second ring-like part 62, and it is possible to dispose the first ring-like part 61 at further outer side in the axial direction. Thus, it is possible to prevent the filled grease 60 from unnecessarily making contact with the rolling elements 30 and the holder 40. Therefore, the reduction in torque of the bearing 1 can be achieved.

Here, in the present embodiment, the outer circumferential edge of each of the seal members 50 is locked by the inner circumferential surface of the outer ring 20. In the configuration in which the grease is disposed so that a single ring-like part is formed as in the related art, when tentatively disposing the grease at the position further separated outward in the axial direction from the rolling elements in order to prevent the grease from collapsing by the own weight to unnecessarily make contact with the rolling elements and the holder, there is a possibility that grease is crushed by the seal member to be leaked through the gap between the outer circumferential edge of the seal member and the outer ring. According to the present embodiment, since the second ring-like part 62 located at the outer side in the axial direction from the first ring-like part 61 is disposed at the opposite side to the outer circumferential edge of the seal member 50 across the first ring-like part 61, it is possible to prevent the second ring-like part 62 from being leaked through the gap between the outer circumferential edge of the seal member 50 and the outer ring 20. Therefore, the leakage of the grease from the bearing 1 can be prevented.

Further, since the rotary apparatus 2 according to the present embodiment is equipped with the bearing 1 described above, it is possible to decrease the rotational resistance of the shaft 3 with respect to the chassis 4, and thus, it is possible to achieve the power saving of the rotary apparatus 2.

It should be noted that although in the method of manufacturing the bearing 1 according to the present embodiment, the nozzle for ejecting the grease is used in both of the first application step S10 and the second application step S20, this method is not a limitation. It is possible to respectively prepare a first nozzle used in the first application step S10 and a second nozzle used in the second application step S20. In this case, it is desirable to perform the first application step S10 and the second application step S20 at respective application positions different from each other. Specifically, the first application step S10 is performed at a first application position, the bearing on which the first application step S10 has been performed is fed to a second application position, and then the second application step S20 is performed at the second application position. Further, it is also possible to perform the first application step S10 on the next bearing at the first application position when the second application step S20 is performed. According to this method, it is possible to shorten the cycle time at each application position. Therefore, it is possible to increase the manufacturing efficiency of the bearing 1. Further, in the manufacturing method of applying the grease to form the ring-like shape while rotating the bearing, since a mechanism for driving the nozzle in the radial direction with respect to the bearing becomes unnecessary, it is possible to simplify a structure of the device for applying the grease.

Second Embodiment

A second embodiment according to the present disclosure will be described with reference to FIG. 9. It should be noted that the configuration except a part described hereinafter is substantially the same as in the first embodiment.

Figure 9:
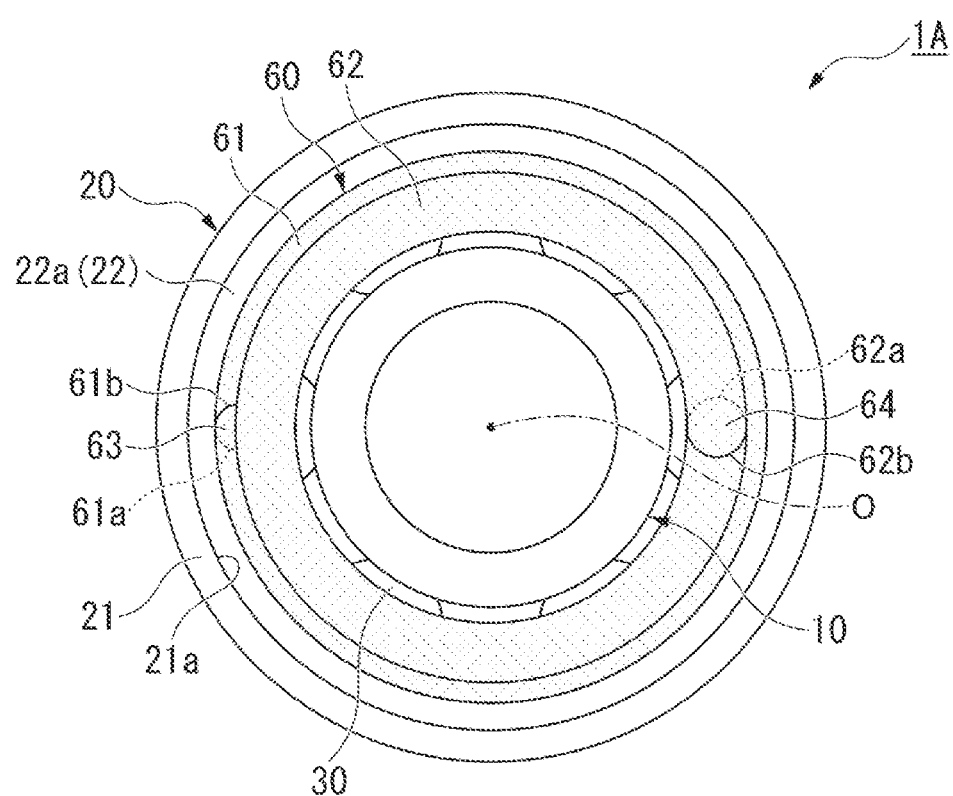
FIG. 9 is a plan view of a rolling bearing according to a second embodiment.

FIG. 9 is a plan view of a rolling bearing according to the second embodiment. It should be noted that in FIG. 9, an illustration of the seal members 50 is omitted in order to make the internal configuration of the bearing 1A eye-friendly.

In the first embodiment shown in FIG. 1, the second overlapping part 64 of the filled grease 60 is disposed at the same position in the circumferential direction as the first overlapping part 63. In contrast, in the second embodiment shown in FIG. 9, the second overlapping part 64 of the filled grease 60 is disposed at a position shifted in the circumferential direction from the first overlapping part 63. The second overlapping part 64 is formed by shifting the starting point and the ending point of the ejection of the grease in the circumferential direction with respect to the first overlapping part 63 in the second application step substantially the same as that in the first embodiment.

Here, the cross-sectional area of the cross-sectional surface of the first ring-like part 61 becomes larger in the first overlapping part 63 than in other portions. Further, the cross-sectional area of the cross-sectional surface of the second ring-like part 62 becomes larger in the second overlapping part 64 than in other portions. When assuming that the first overlapping part 63 and the second overlapping part 64 are disposed at the same position in the circumferential direction, the filled grease 60 becomes apt to spread at the position where the first overlapping part 63 and the second overlapping part 64 overlap each other. According to the present embodiment, since the first overlapping part 63 and the second overlapping part 64 are disposed at the respective positions shifted in the circumferential direction from each other, it is possible to prevent the filled grease 60 from spreading in the axial direction to unnecessarily make contact with the rolling elements 30 and the holder 40. Therefore, the reduction in torque of the bearing 1A can be achieved.

Third Embodiment

A third embodiment according to the present disclosure will be described with reference to FIG. 10. It should be noted that the configuration except a part described hereinafter is substantially the same as in the first embodiment.

Figure 10:
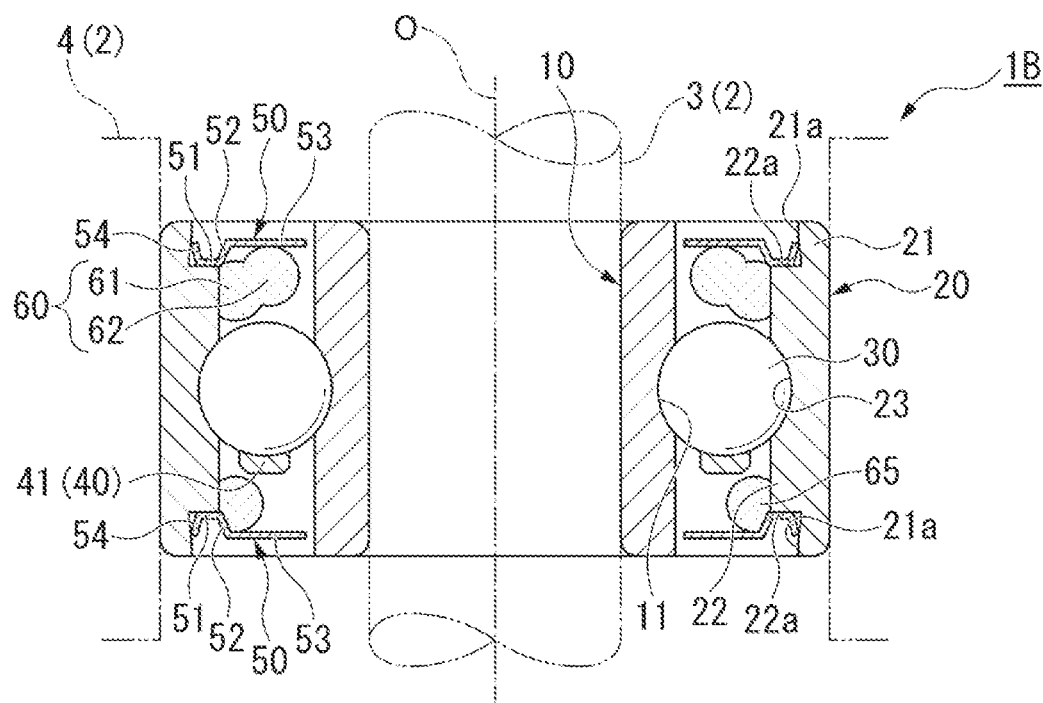
FIG. 10 is a cross-sectional view of a rolling bearing according to a third embodiment.

FIG. 10 is a cross-sectional view of a rolling bearing according to the third embodiment.

In the third embodiment shown in FIG. 10, the bearing 1B is provided with other grease 65 in addition to the filled grease 60. The other grease 65 is disposed at an opposite side to the filled grease 60 in the axial direction with respect to the rolling elements 30. In other words, the other grease 65 is disposed at the same side as the main body part 41 of the holder 40 in the axial direction with respect to the rolling elements 30. The other grease 65 is disposed between the rolling elements 30 and the seal member 50. The other grease 65 is disposed in the annular space between the inner ring 10 and the outer ring 20. The other grease 65 has contact with a contact target (the outer ring 20 in the present embodiment) of the filled grease 60 out of the inner ring 10 and the outer ring 20. Similarly to the filled grease 60, the other grease 65 has contact with one of the inner ring 10 and the outer ring 20, and is separated from the other thereof. The other grease 65 is separated from the rolling elements 30 and the holder 40. The other grease 65 extends to form a circumferential shape centering on the common axis O. The other grease 65 has contact with a place at the outer side in the axial direction from the outer ring rolling surface 23 in the inner circumferential surface of the protruding part 22 of the outer ring 20.

It should be noted that the configuration of the other grease is not limited to the configuration described above. It is possible for the other grease to have contact with the inner ring 10, and to be separated from the outer ring 20. Further, it is possible for the other grease to have contact with at least either one of the rolling elements 30 and the holder 40. Further, the other grease is not required to extend to form the circumferential shape. For example, the other grease can extend to form a circular arc shape, or can be disposed like dots along the circumferential direction.

According to the present embodiment, it is possible to increase the total amount of the grease disposed in the bearing 1B with the other grease 65 while preventing the other grease 65 from interfering with the filled grease 60 to make the filled grease 60 lose shape. Therefore, it is possible to provide the bearing 1B the extension of life of which is achieved.

Fourth Embodiment

A fourth embodiment according to the present disclosure will be described with reference to FIG. 11. It should be noted that the configuration except a part described hereinafter is substantially the same as in the first embodiment.

Figure 11:
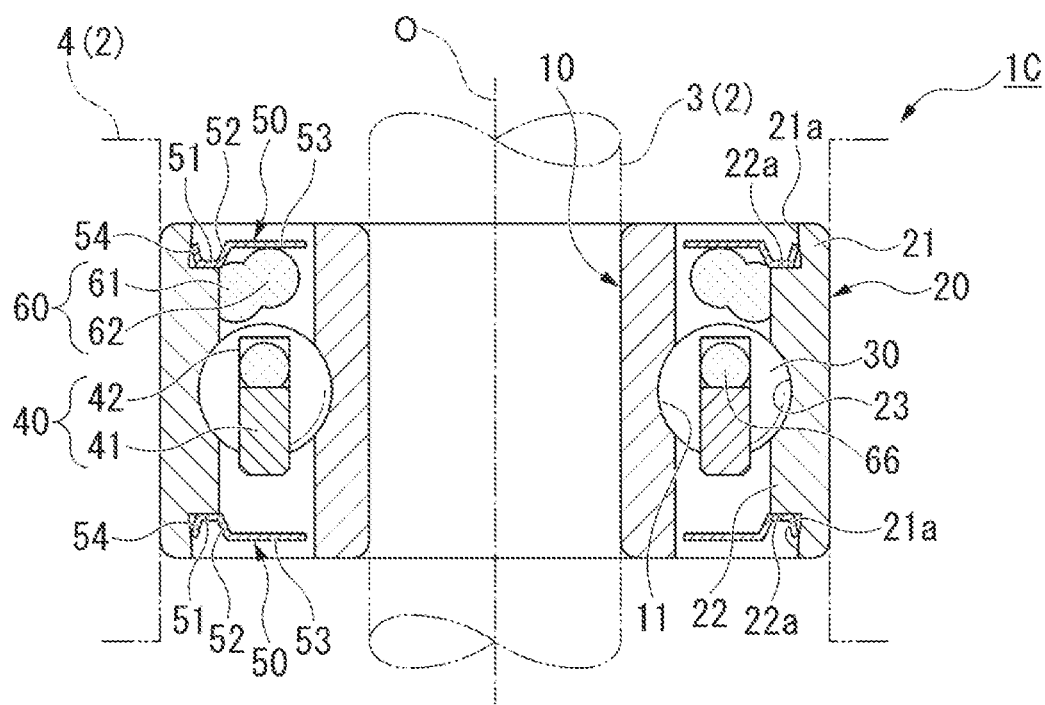
FIG. 11 is a cross-sectional view of a rolling bearing according to a fourth embodiment.

FIG. 11 is a cross-sectional view of a rolling bearing according to the fourth embodiment.

In the fourth embodiment shown in FIG. 11, the bearing 1C is provided with other grease 66 in addition to the filled grease 60. The other grease 66 is supported by the holder 40. The other grease 66 is disposed in a pocket between the pair of stop parts 42 at the opposite side to the rolling elements 30 across the stop part 42 in the holder 40. The other grease 66 has contact with the main body part 41 of the holder 40 in the illustrated example, but can have contact with the stop parts 42. The other grease 66 is separated from the rolling elements 30 and the filled grease 60. It should be noted that the other grease 66 can be disposed in all of the pockets of the holder 40, or can also be disposed in only some of the pockets.

According to the present embodiment, it is possible to increase the total amount of the grease disposed in the bearing 1C due to the other grease 66. Therefore, it is possible to provide the bearing 1C the extension of life of which is achieved.

It should be noted that the present disclosure is not limited to the above embodiments described with reference to the drawings, but a variety of modified examples can be cited within the scope or the spirit of the present disclosure.

For example, in the embodiments described above, the inner ring 10 is disposed as the rotary ring, and the outer ring 20 is disposed as the stationary ring. Further, the filled grease 60 has contact with the outer ring 20 as the stationary ring. However, the bearing ring with which the filled grease has contact is not required to be the stationary ring. In other words, the inner ring can be disposed as the stationary ring, the outer ring is disposed as the rotary ring, and the filled grease can have contact with the inner ring as the stationary ring. Further, the inner ring can be disposed as the stationary ring, the outer ring is disposed as the rotary ring, and the filled grease can have contact with the outer ring as the rotary ring. In this case, although the filled grease rotates together with the outer ring, since the displacement of the grease toward the outer side in the radial direction is restricted by the outer ring even when the centrifugal force acts on the filled grease, it is possible to keep the filled grease in the shape immediately after the application. It should be noted that it is desirable for the filled grease to have contact with the bearing ring to which the seal member is attached out of the inner ring and the outer ring.

Further, in the embodiments described above, the ejection of the grease in the first application step S10 and the ejection of the grease in the second application step S20 are performed separately from each other. However, it is possible to continuously perform the ejection of the grease in the first application step S10 and the ejection of the grease in the second application step S20. Thus, it is possible for one circumferential end part in the first ring-like part of the filled grease and the other circumferential end part in the second ring-like part to be connected to each other.

Further, in the embodiments described above, the volume ratio between the first ring-like part 61 and the second ring-like part 62 of the filled grease 60 is not particularly limited. For example, the first ring-like part 61 and the second ring-like part 62 can be equal in cross-sectional area of the cross-sectional surface to each other, or different from each other.

Further, the filled grease 60 has the two ring-like parts 61, 62 in the embodiments described above, but can have three or more ring-like parts.

Further, in the embodiments described above, the fan motor is illustrated as the rotary apparatus, but the rotary apparatus is not limited thereto. For example, it is possible to apply the present disclosure to at least either one of a spindle motor and a swing arm of a hard disk drive as the rotary apparatus.

Besides the above, it is arbitrarily possible to replace the constituent in the embodiments described above with a known constituent within the scope or the spirit of the present disclosure, and further, it is possible to arbitrarily combine the embodiments described above with each other. For example, it is possible to dispose the other grease 65 in the third embodiment or the other grease 66 in the fourth embodiment to the bearing 1A in the second embodiment.

What is claimed is:

1. A rolling bearing comprising:
   an inner ring and an outer ring disposed coaxially with each other;
   a rolling element disposed between the inner ring and the outer ring;
   a seal member configured to cover an area between the inner ring and the outer ring from an outside in an axial direction; and
   grease disposed between the rolling element and the seal member, wherein the grease includes:
   a first ring-like part which extends to form a circumferential shape centering on a common axis of the inner ring and the outer ring, and which has contact with one of the inner ring and the outer ring; and
   a second ring-like part which extends to form a circumferential shape centering on the common axis, which is connected to the first ring-like part at an outer side in the axial direction, and which has contact with the seal member.

2. The rolling bearing according to claim 1, wherein the one of the inner ring and the outer ring is disposed as a stationary ring.

3. The rolling bearing according to claim 1, wherein the inner ring is disposed as rotary ring and the outer ring is disposed as a stationary ring.

4. The rolling bearing according to claim 1, wherein the seal member is attached to the one of the inner ring and the outer ring.

5. The rolling bearing according to claim 1, wherein the second ring-like part is disposed at an opposite side to the one of the inner ring and the outer ring in a radial direction centering on the common axis with respect to the first ring-like part.

6. The rolling bearing according to claim 1, wherein
   the first ring-like part has a first overlapping part which extends from one circumferential end part as much as an angle no smaller than 360° and smaller than 720° centering on the common axis to reach another circumferential end part to thereby reduplicate when viewed from the axial direction,
   the second ring-like part has a second overlapping part which extends from one circumferential end part as much as an angle no smaller than 360° and smaller than 720° centering on the common axis to reach another circumferential end part to thereby reduplicate when viewed from the axial direction, and
   the second overlapping part is disposed at a position shifted in a circumferential direction around the common axis with respect to the first overlapping part.

7. The rolling bearing according to claim 1, further comprising other grease disposed at an opposite side to the grease in the axial direction with respect to the rolling element.

8. A rotary apparatus comprising:

a rotary element disposed rotatably;

a support element configured to rotatably support the rotary element; and a rolling bearing intervening between the rotary element and the support element, the rolling bearing comprising:

an inner ring and an outer ring disposed coaxially with each other;

a rolling element disposed between the inner ring and the outer ring;

a seal member configured to cover an area between the inner ring and the outer ring from an outside in an axial direction; and grease disposed between the rolling element and the seal member, wherein the grease includes:

a first ring-like part which extends to form a circumferential shape centering on a common axis of the inner ring and the outer ring, and which has contact with one of the inner ring and the outer ring; and a second ring-like part which extends to form a circumferential shape centering on the common axis, which is connected to the first ring-like part at an outer side in the axial direction, and which has contact with the seal member.

9. A method of manufacturing a rolling bearing comprising: an inner ring and an outer ring disposed coaxially with each other; a rolling element disposed between the inner ring and the outer ring; a seal member configured to cover an area between the inner ring and the outer ring from an outside in an axial direction; and grease disposed between the rolling element and the seal member, wherein the grease includes: a first ring-like part which extends to form a circumferential shape centering on a common axis of the inner ring and the outer ring, and which has contact with one of the inner ring and the outer ring; and a second ring-like part which extends to form a circumferential shape centering on the common axis, which is connected to the first ring-like part at an outer side in the axial direction, and which has contact with the seal member, the method comprising:

a first application step of ejecting the grease from a first nozzle at a first application position to form the first ring-like part; and a second application step of ejecting the grease from a second nozzle different from the first nozzle at a second application position different from the first application position to form the second ring-like part.

* * * * *